United States Patent [19]

D'Anci

[11] Patent Number: 4,762,292
[45] Date of Patent: Aug. 9, 1988

[54] VACUUM COLUMN WEB LOOP POSITION SENSING SYSTEM

[76] Inventor: Alexander M. D'Anci, 13 Payne St., Springvale, Me. 04083

[21] Appl. No.: 9,147

[22] Filed: Jan. 30, 1987

[51] Int. Cl.$^4$ .................... G11B 15/06; G01N 21/86
[52] U.S. Cl. .................. 242/184; 242/75.52; 250/561
[58] Field of Search ................. 242/182–184, 242/57, 75, 75.5–75.52, 186; 226/118, 45, 119; 250/561; 360/71, 73

[56] References Cited

U.S. PATENT DOCUMENTS

| | | | |
|---|---|---|---|
| 3,206,133 | 9/1965 | Forster et al. | 242/190 |
| 3,251,048 | 5/1966 | Killen | 250/561 X |
| 3,261,564 | 7/1966 | Sharpe | 242/184 |
| 3,308,301 | 3/1967 | Weissbach | 250/219 |
| 3,310,250 | 3/1967 | Michiels et al. | 242/184 |
| 3,379,390 | 4/1968 | Eastcott | 250/561 X |
| 3,435,245 | 3/1969 | Lee | 250/561 |
| 3,450,887 | 6/1969 | Nirenberg | 250/561 |
| 3,489,909 | 1/1970 | Martel | 250/561 |
| 3,495,089 | 2/1970 | Brown | 250/561 |
| 3,619,624 | 11/1971 | Sorenson | 250/218 |
| 3,791,607 | 2/1974 | Klang et al. | 242/184 |
| 3,866,855 | 2/1975 | Bryer | 242/184 |
| 3,898,693 | 8/1975 | Chang | 360/73 |
| 3,901,607 | 8/1975 | Kingsland | 250/561 X |
| 4,104,685 | 8/1978 | Chang | 360/84 |
| 4,309,728 | 1/1982 | Takizawa et al. | 360/71 |
| 4,509,007 | 4/1985 | Barsotti et al. | 324/60 C |
| 4,616,274 | 10/1986 | Nagaoka | 360/71 |
| 4,660,965 | 4/1987 | Matsumoto | 250/561 X |

Primary Examiner—David Werner
Attorney, Agent, or Firm—Staas & Halsey

[57] ABSTRACT

A web loop position sensing system detects the position of web material, such as magnetic tape, in a vacuum column by using light emitters and receptors arranged along an array outside the vacuum column. The light emitters direct light towards a retroreflective surface formed of glass bead tape on an interior side of the vacuum column. Light reflected by the glass bead tape is received by the light receptors in the array. The quantity of light received by the light receptors is detected and used to control a supply reel in a tape transport in which the vacuum column is used, thereby maintaining the web loop tension within the vacuum column.

15 Claims, 3 Drawing Sheets

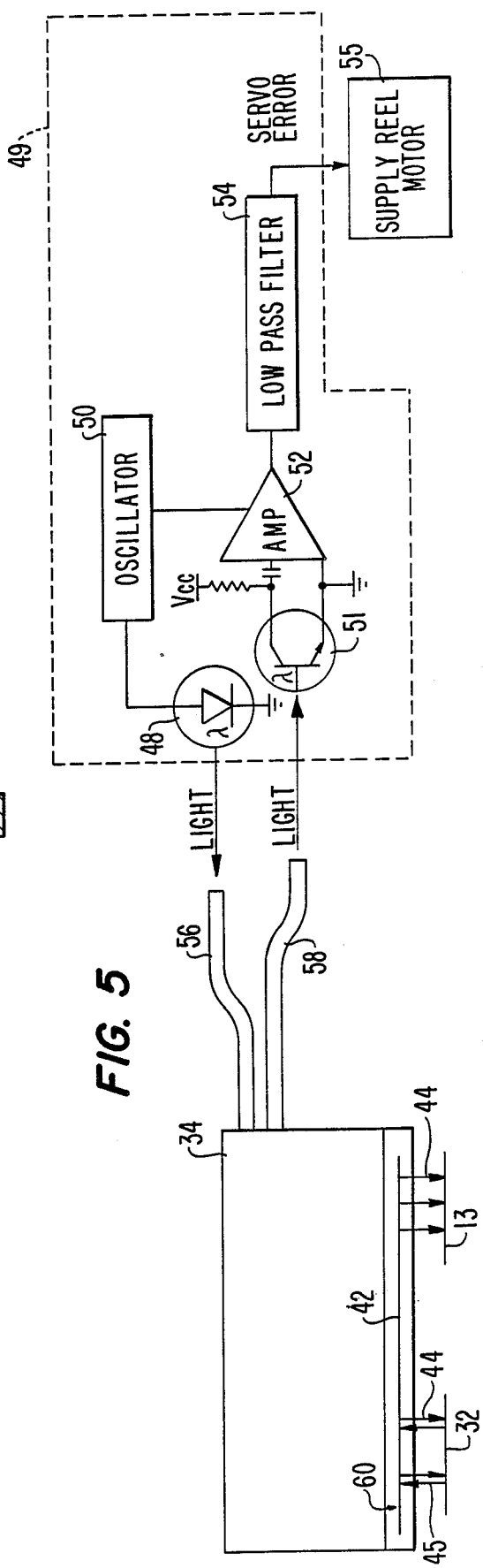
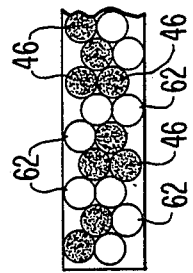
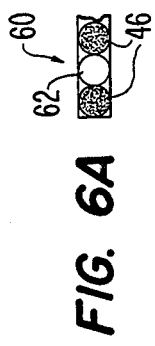
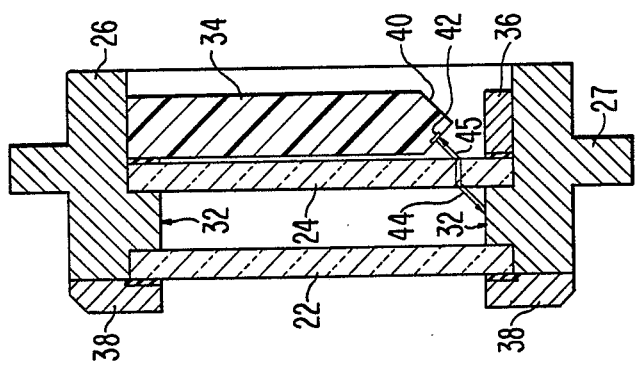

VACUUM COLUMN WEB LOOP POSITION SENSING SYSTEM

BACKGROUND OF THE INVENTION

1. Field of the Invention

The present invention relates to a vacuum column web loop position sensing system, and more particularly, to an optical sensing system used to detect the position of magnetic tape in a vacuum column in which light is emitted from behind the vacuum column and reflected from the bottom of the vacuum column back towards light receptors also positioned behind the vacuum column.

2. Description of the Related Art

Vacuum columns are commonly used to maintain a constant amount of tension on web material, such as magnetic tape, when the web material is transported from one reel to another. The purpose of using such columns is to provide slack in the web material to allow for differences in speed of rotation of the supply and take-up reels to prevent breaking without permitting the web material to become snarled. In order for the vacuum column to perform these functions, it is necessary that the web material form a loop between the bottom and the mouth of the vacuum column.

Prior art devices are known for detecting the position of a tape loop in magnetic tape devices, such as recorders, players, readers, etc., to ensure that the vacuum column is able to perform its functions. Examples of prior art tape loop sensors include a series of discrete sensing elements, such as the ports in the vacuum sensing devices disclosed in U.S. Pat. Nos. 4,509,007 to Barsotti et al. and 3,866,855 to Bryer, the strips of solar cells positioned along the wear surface of a vacuum column disclosed in U.S. Pat. No. 3,898,693 to Chang and a multi-prism bar disclosed in U.S. Pat. No. 3,791,607 to Klang et al. Optical sensors are also used in the prior art to detect a transparent leader, as disclosed in U.S. Pat. No. 4,616,274 to Nagaoka, and the position of a mechanical tensioning device used instead of a vacuum column, as disclosed in U.S. Pat. No. 4,104,685 to Chang.

However, these prior art devices have several drawbacks. When an array of discrete sensors is used, a step voltage is produced resulting in a control signal which is not smooth. The prior art devices typically rely upon the positioning of light receptors (photocells) along the side of a vacuum column upon which the tape slides. Whether these light receptors are photocells or a multi-prism bar, they should be protected from the tape that slides over the light receptors while retaining transparency to permit light to pass therethrough. In one prior art device, this is accomplished by drilling holes in metal spacers and positioning the light receptors (and light emitters) in the hole so that they do not contact the tape. This is an expensive manufacturing process and requires careful alignment of the light emitters and receptors.

In addition, it is necessary to protect the light receptors from stray light. Typically, stray light protection requires an opaque cover or shield for the vacuum column which prevents visual confirmation of tape loop position and adds to the cost. Also, the use of discrete light receptors requires that the cost of providing multiple receptors must be offset by the resolution of the tape's position which is desired. For example, a sensing system using five light receptors is inexpensive, but only provides an indication of five possible positions of the tape loop, while using 50 sensors provides a more precise indication of the tape loop position, but is ten times as expensive.

SUMMARY OF THE INVENTION

An object of the present invention is to provide a web loop position sensing system for a vacuum column which does not require light emitters or receptors to be positioned along the side of a vacuum column.

Another object of the present invention is to provide an optical web loop position sensing system which is substantially immune to interference by stray light.

Yet another object of the present invention is to provide a web loop position sensing system with high resolution of the position of the web loop.

A further object of the present invention is to provide a web loop position sensing system which can be used with a conventionally constructed vacuum column.

Another object of the present invention is to provide an optical web loop position sensing system in which alignment of light emitters and receptors is not critical.

The above objects are attained by providing an apparatus for sensing position of an opaque object extending along a predetermined path, comprising a retroreflective surface extending along a first side of the predetermined path; light emitting means for emitting light along an array disposed on a second side of the predetermined path, opposite the first side, such that the opaque object obstructs light emitted by the light emitting means from reaching the retroreflective surface where the opaque object is present on the predetermined path; a plurality of light receiving means, distributed along the array on the second side of the predetermined path, for receiving a quantity of light emitted from the light emitting means and reflected by the retroreflective surface; and detection means for detecting the quantity of light received by said light from said light emitting means by said light receiving means and indicating the tape loop length in dependence upon the quantity of light detected.

Preferably, the retroreflective surface is a conventional glass bead tape which is capable of reflecting light, having a non-perpendicular angle of incidence, directly back towards the light source. Thereby, the light emitting and receiving means may be positioned behind a transparent plate of a vacuum column with the array running along the column. The light emitting and receiving means each preferably comprise a plurality of optical fibers having ends evenly distributed and intermixed along the array. Preferably, the light emitting means also comprises an infrared light source operatively connected to an oscillator to produce light pulses. The detection means preferably comprises an infrared phototransistor positioned at the opposite end of the optical fibers which comprise the light receiving means and an AC coupled amplifier, operatively connected to the infrared phototransistor and the oscillator, for detecting the voltage across the phototransistor in synchronism with the output of the oscillator.

These objects, together with other objects and advantages which will be subsequently apparent, reside in the details of construction and operation as more fully hereinafter described and claimed, reference being had to the accompanying drawings forming a part hereof wherein like reference numerals refer to like parts throughout.

BRIEF DESCRIPTION OF THE DRAWINGS

FIG. 4 is a cross-sectional side view of the vacuum column illustrated in FIGS. 2 and 3;

FIG. 5 is a block diagram of a tape loop sensing system according to the present invention; and FIGS. 6A and 6B are front views of alternate arrangements of light emitters and receptors in the channel of the scanning block illustrated in FIG. 5.

DESCRIPTION OF THE PREFERRED EMBODIMENT

Figure 1:
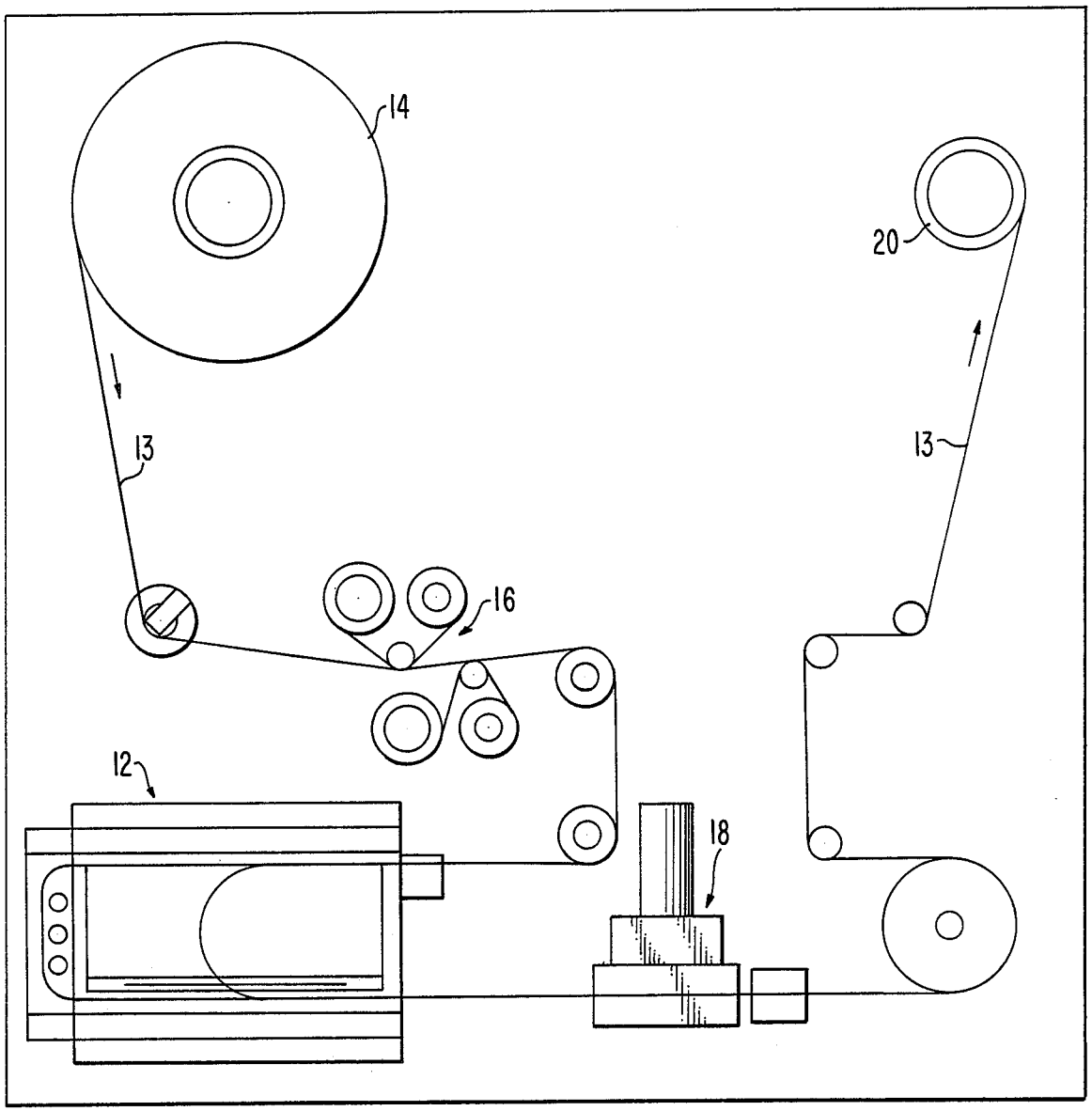
FIG. 1 is a schematic front view of a tape transport utilizing a vacuum column.

In FIG. 1, an illustration of a conventional magnetic tape transport 10 utilizing a vacuum column 12 according to the present invention is schematically illustrated. Magnetic tape 13 from supply reel 14 passes around cleaning devices and idle wheels 16, through the vacuum column 12 and tape punch 18, and then onto take-up reel 20.

Figure 2:
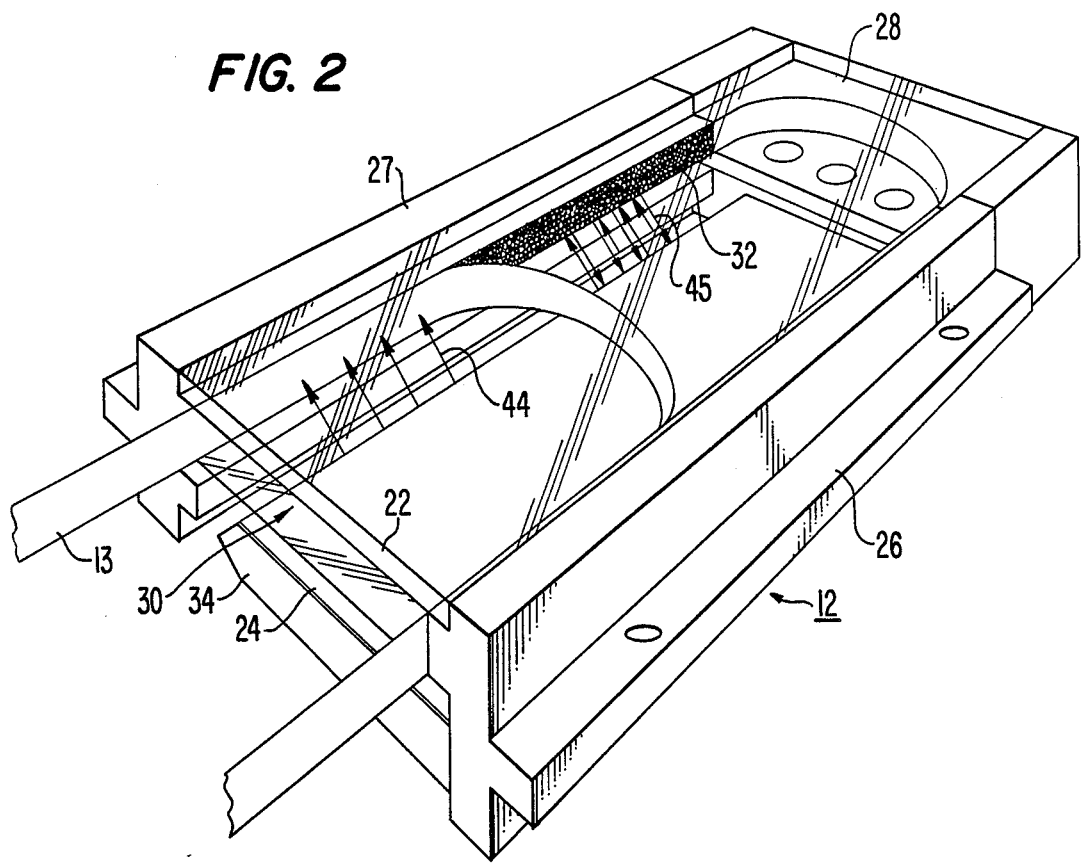
FIG. 2 is a perspective view of a vacuum column including a tape loop sensing system according to the present invention.

As best illustrated in FIG. 2, the vacuum column 12 is constructed with front 22 and rear 24 glass plates separated by metal spacers 26 and 27. A conventional vacuum assembly 28 produces a partial vacuum in the tape column 12 between the front and rear glass plates 22, 24 and metal spacers 26 and 27. The tape 13 is thereby pulled into the space 30 bounded by the vacuum assembly 28, metal spacers 26 and 27 and glass plates 22 and 24. Adhesive glass bead tape 32 covers the surfaces of the metal spacers 26 and 27 which face the space 30. The glass bead tape 32 preferably is used in the vacuum column 12 to provide a surface which is highly resistant to wear. In addition, the retroreflective properties of the glass bead tape 32 are used in accordance with the present invention as described below.

According to the present invention, a scanner block 34 is positioned outside the vacuum column 12, preferably behind the rear glass plate 24. A scanner block constructed as described below is now available as part number B53PMX.008 from Banner Engineering, Inc. of Minneapolis, Minn. As illustrated in FIGS. 2 and 4, the scanner block 34 is secured to the upper metal spacer 26 and helps secure the rear glass plate 24 in position. A thin block 36 is secured to the lower metal spacer 27 to secure the other side of the rear glass plate 24 and metal hold-downs 38 are similarly secured to the upper and lower metal spacers to secure the front glass plate 22.

Figure 3:
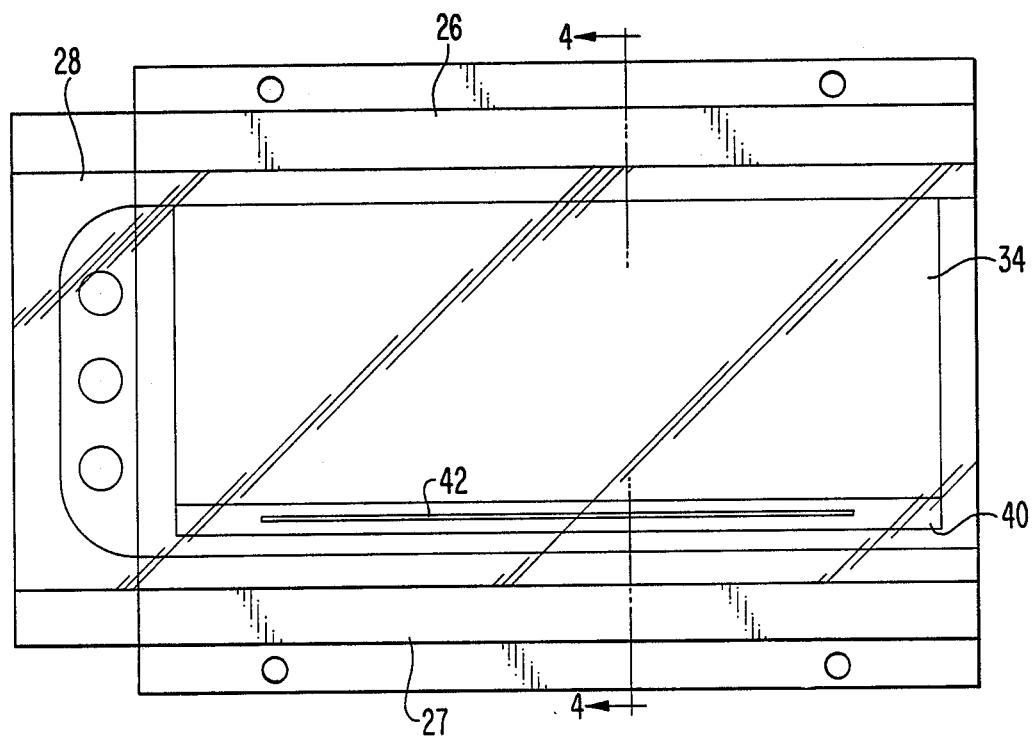
FIG. 3 is a front view of the vacuum column illustrated in FIG. 2.

The unsecured end 40 of the scanner block 34 is beveled with one surface obliquely facing the glass bead tape 32 on the lower metal spacer 27 at an angle of, preferably, 45°. As illustrated in FIGS. 3 and 5, a channel 42 runs along a majority of the length of the scanner block 34. The channel preferably has a width of 0.008 inch. As indicated by the emitted light path 44, according to the present invention, pulsed light is emitted from the channel 42 and twice refracted by opposing surfaces of the rear glass plate 24 so that the pulsed light is directed onto the retroreflective surface of the glass bead tape 32. The glass bead tape 32 reflects the light emitted from the channel 42 in all directions. Some of the reflected light is directed back along reflected light path 45 which is substantially the same as the emitted light path 44. The light which travels the reflected light path 45 is returned to the channel 42 and received by light receptors 46 illustrated in FIGS. 6A and 6B and discussed in more detail below. As illustrated in FIG. 5, when the magnetic tape 13 interposes between the channel 42 and the glass bead tape 32, none of the light 44 emitted from the channel 42 is reflected back thereto, only when the light path 44 to the glass bead tape 32 is unobstructed by the magnetic tape 13 do the light receptors 46 in the channel 42 receive reflected light 45. Thus, the tape loop length can be determined by comparing the quantity of light received by the light receptors 46 with a predetermined quantity of light corresponding to unobstructed reflection by the retroreflective surface of the glass bead tape 32 of pulsed light emitted from the channel 42.

With continued reference to FIG. 5, the light following light path 45 towards the glass bead tape 32 is preferably pulsed light generated by an infrared light source 48, such as an LED, in a scanner module 49, such as a F52AN05 manufactured by Banner Engineering, Inc. of Minneapolis, Minn. The LED 48 is powered by an oscillator 50 operating at a predetermined frequency, preferably in the range of 1 to 50 kHz. The light pulses reflected from the glass bead tape 32 follow light path 45 and are received by the light receptors 46. The received light pulses are supplied to a phototransistor 51 which is turned on and off by the received light pulses. An amplifier 52 is AC coupled to the oscillator 50 to detect the voltage across the phototransistor 51 in synchronism with the frequency of the oscillator 50. A low pass filter 54 removes the AC component in the output of the amplifier 52 to produce a servo error indicative of the tape loop length of the tape 13, which controls the rotation speed of motor 55 driving the supply reel 14.

Preferably, the pulsed light is transmitted from the LED 48 to the channel 42 by a first group of optical fibers formed in a bundle 56. A second group of optical fibers are formed in a bundle 58 to route the received light from the channel 42 to the phototransistor 51. Within the scanner block 34, the first and second groups of optical fibers are intermixed and evenly distributed along the channel 42. Thus, the optical fibers in bundle 56 form light distributing means and the optical fibers in bundle 58 form light receiving means.

The ends of the optical fibers from bundles 56 and 58 are intermixed in the channel 42. By illustrative example, the end portion 60 of the channel 42, indicated in FIG. 5, is illustrated in exploded view FIG. 6A, showing alternating light receptors 46 and light emitters 62 in the channel 42. The light emitters 62 are ends of the fibers included in bundle 56, while the light receptors 46 are ends of the fibers included in bundle 58. Another illustrative example of the arrangement of the fiber ends in the channel 42 is illustrated in FIG. 6B. As illustrated in FIG. 6B, the channel 42 may be formed wider than the width of a single optical fiber with the ends 46 and 62 of the optical fibers in bundles 56 and 58 intermixed and randomly distributed in a substantially even manner along the channel 42. Thus, the light receptors 46 and light emitters 62 may form a one-dimensional array, as illustrated in FIG. 6A, or a narrow, two-dimensional array, as illustrated in FIG. 6B.

The above-described tape loop length sensing system provides several advantages over the prior art. The system is not affected by stray light, therefore no opaque light shield is necessary for the front of the tape storage column and an operator is able to visually inspect the tape loop position. The use of glass bead tape provide a surface which is highly resistant to wear and its retroreflective properties eliminates the need for careful alignment of light emitters and receptors. A vacuum column constructed according to the present invention is easily assembled, requires no high accuracy drilling for the tape loop sensing elements and is less costly than prior art systems. Finally, the servo error signal produced by the tape loop length sensing system is more precise and provides a quick, smooth indication of changes in tape loop length.

The many features and advantages of the present invention are apparent from the detailed specification, and thus, it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described.

For example, the scanner block 34 may be secured to the lower metal spacer 27, instead of the upper metal spacer 26 and the vacuum column 12 may be oriented in different directions, e.g., with the spacers 26 and 27 on left and right sides and the vacuum assembly 28 at the bottom. In addition, the scanner block 34 may be positioned in front of the front glass plate 22 with the rear glass plate 24 replaced by a metal surface. Accordingly, suitable modifications and equivalents may be resorted to, all falling within the scope and spirit of the invention.

What is claimed is:

1. An apparatus for sensing tape loop length of tape in a tape storage column having sides, one of the sides being formed from a transparent plate, said apparatus comprising:
    a retroreflective surface on one of the sides of the tape storage column abutting the transparent plate;
    light emitting means, positioned outside the tape storage column adjacent to the transparent plate, for directing light towards said retroreflective surface, the tape obstructing the light emitted from said light emitting means to the extent that the tape extends into the tape storage column;
    a plurality of light receiving means, disposed along an array outside the tape storage column and adjacent to the transparent plate, for receiving a quantity of light emitted from said light emitting means and reflected by said retroreflective surface; and
    detection means for detecting the quantity of light received by said light from said light emitting means by said light receiving means and indicating the tape loop length in dependence upon the quantity of light detected.

2. An apparatus as recited in claim 1,
    wherein said light emitting means comprises:
        pulsed infrared light generating means for generating pulsed infrared light at a predetermined frequency; and
        light distributing means, intermixed with said light receiving means in the array, for distributing the pulsed infrared light evenly along the array, and
    wherein said detection means is synchronized using the predetermined frequency to detect reflected light pulses.

3. An apparatus as recited in claim 2,
    wherein said light distributing means comprises a first group of optical fibers having first ends positioned to receive the pulsed infrared light generated by said pulsed infrared light generating means and having second ends evenly distributed along the array, and
    wherein said light receiving means comprises a second group of optical fibers having first ends evenly distributed along the array and intermixed with the second ends of said first group of optical fibers and having second ends positioned to supply the reflected light pulses to said detection means.

4. An apparatus as recited in claim 3,
    wherein the second ends of said first group of optical fibers are positioned in the array to emit the pulsed infrared light towards said retroreflective surface with a nonperpendicular angle of incidence, and
    wherein said retroreflective surface is formed to reflect at least a portion of the pulsed infrared light emitted by said first group of optical fibers back towards the array.

5. An apparatus as recited in claim 4, wherein said retroreflective surface is a glass bead tape.

6. An apparatus as recited in claim 5,
    wherein said pulsed infrared light generating means comprises:
        an infrared light source disposed opposite the first ends of said first group of optical fibers; and
        an oscillator, coupled to the infrared light source, for producing a signal having the predetermined frequency, and
    wherein said detection means comprises:
        an infrared phototransistor positioned to receive the reflected light pulses from the second ends of said second group of optical fibers;
        an amplifier, operatively coupled to said infrared phototransistor and said oscillator, for detecting the voltage across said infrared phototransistor in synchronism with the predetermined frequency; and
        a low pass filter operatively connected to the output of said amplifier.

7. An apparatus for sensing position of an opaque object extending aong a predetermined path, comprising:
    a retroreflective surface extending along a first side of the predetermined path;
    light emitting means for emitting light towards said retroreflective surface from a second side of the predetermined path, different than the first side, such that the opaque object obstructs light emitted by said light emitting means from reaching said retroreflective surface where the opaque object is present on the predetermined path;
    a plurality of light receiving means, distributed along an array on the second side of the predetermined path, for receiving a quantity of light emitted from said light emitting means and reflected by said retroreflective surface; and
    detection means for detecting the quantity of light received from said light emitting means by said light receiving means and indicating the position of the opaque object in dependence upon the quantity of light detected.

8. An apparatus as recited in claim 7,
    wherein said light emitting means comprises:

pulsed infrared light generating means for generating pulsed infrared light at a predetermined frequency; and light distributing means, intermixed with said light receiving means in the array, for distributing the pulsed infrared light evenly along the array, and wherein said detection means is synchronized using the predetermined frequency to detect reflected light pulses.

9. An apparatus as recited in claim 8, wherein said light distributing means comprises a first group of optical fibers having first ends positioned to receive the pulsed infrared light generated by said pulsed infrared light generating means and having second ends evenly distributed along the array, and wherein said light receiving means comprises a second group of optical fibers having first ends evenly distributed along the array and intermixed with the second ends of said first group of optical fibers and having second ends positioned to supply the reflected light pulses to said detection means.

10. An apparatus as recited in claim 9, wherein the second ends of said first group of optical fibers are positioned in the array to emit the pulsed infrared light towards said retroreflective surface with a nonperpendicular angle of incidence, and wherein said retroreflective surface is formed to reflect at least a portion of the pulsed infrared light emitted by said first group of optical fibers back towards the array.

11. An apparatus as recited in claim 10, wherein said retroreflective surface is a glass bead tape.

12. An apparatus as recited in claim 11, wherein said light generating means comprises:
an infrared light source disposed opposite the first ends of said first group of optical fibers; and
an oscillator, coupled to the infrared light source, for producing a signal having the predetermined frequency, and wherein said detection means comprises:
an infrared phototransistor positioned to receive the reflected light pulses from the second end of said second group of optical fibers;
an amplifier, operatively coupled to said infrared phototransistor and said oscillator, for detecting the voltage across said infrared phototransistor in synchronism with the predetermined frequency; and
a low pass filter operatively connected to the output of said amplifier.

13. An apparatus for sensing tape loop length of tape in a tape storage column having top, bottom, front and rear sides partially enclosing a space, an open end for accepting the tape and a closed end including a vacuum assembly for producing a partial vacuum in the partially enclosed space to pull slack in the tape into the tape storage column, at least the rear side including a transparent plate, said apparatus comprising:

a glass bead surface substantially covering the bottom side of the tape storage column;

light emitting means for directing infrared light towards said glass bead surface, said light emitting means including an oscillator for producing a signal having a predetermined frequency, an infrared light emitting diode connected to and powered by said oscillator to produce pulsed infrared light, and a first group of optical fibers having first ends bundled together and disposed opposite said infrared light emitting diode to receive the pulsed infrared light therefrom and having second ends emitting the pulsed infrared light;

a scanner block, disposed behind the rear side of the tape storage column, for supporting the second ends of said first group of optical fibers, said scanner block having a channel substantially parallel to the bottom side of the tape storage column and separated therefrom by the transparent plate in the rear side of the tape storage column, the second ends of said first group of optical fibers being evenly distributed along the channel in said scanner block, a portion of the pulsed infrared light emitted from the second ends of said first group of optical fibers reflecting from said glass bead surface back to the channel in said scanner block, but the pulsed infrared light striking the tape not being reflected back;

a second group of optical fibers having first ends distributed evenly along the channel in said scanner block and intermixed with the second ends of said first group of optical fibers, for receiving infrared light pulses from the glass bead surface and having second ends bundled together and emitting the received infrared light pulses; and a scanner module for detecting the quantity of light reflected by said glass bead surface to determine the tape loop length of the tape in the tape storage column, said scanner module including an infrared phototransistor disposed opposite the second ends of said second group of optical fibers to detect the received infrared light pulses emitted from the second ends of said second group of optical fibers, an amplifier, operatively connected to said infrared phototransistor and said oscillator, for detecting the voltage across said infrared phototransistor in synchronism with the predetermined frequency, and a low pass filter, operatively connected to the output of said amplifier, for outputting a servo error signal.

14. A method for sensing position of an opaque object extending along a predetermined path, comprising the steps of:

(a) emitting light from light emitters, distributed along an array, the light being directed towards a retroreflective surface, the predetermined path of the object passing between the light emitters and the retroreflective surface;

(b) receiving light via light receptors distributed along the array and intermixed with the light emitters;

(c) detecting a quantity of reflected light emitted from the light emitters and received by the light receptors; and (d) determining the position of the opaque object by comparing the quantity of reflected light detected in step (c) with a predetermined quantity of light corresponding to unobstructed reflection by the retroreflective surface of the light emitted from the light emitters.

15. A method as recited in claim 14, wherein said emitting in step (a) comprises the steps of:
(ai) generating pulsed infrared light with a predetermined frequency; and
(aii) distributing the pulsed infrared light evenly along the array, and
wherein said detecting in step (c) is synchronized using the predetermined frequency to detect reflected light pulses.

* * * * *